(12) United States Patent
Kalia et al.

(10) Patent No.: US 9,239,406 B2
(45) Date of Patent: Jan. 19, 2016

(54) DOWNHOLE TREATMENT MONITORING SYSTEMS AND METHODS USING ION SELECTIVE FIBER SENSORS

(71) Applicant: Halliburton Energy Services, Inc. ("HESI"), Duncan, OK (US)

(72) Inventors: Nitika Kalia, Cypress, TX (US); Etienne M. Samson, Cypress, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 501 days.

(21) Appl. No.: 13/717,979

(22) Filed: Dec. 18, 2012

(65) Prior Publication Data

US 2014/0172302 A1    Jun. 19, 2014

(51) Int. Cl.
*G01V 9/00* (2006.01)
*G06F 15/00* (2006.01)
(Continued)

(52) U.S. Cl.
CPC . *G01V 9/00* (2013.01); *E21B 47/10* (2013.01); *E21B 47/102* (2013.01); *E21B 47/123* (2013.01); *G06F 15/00* (2013.01)

(58) Field of Classification Search
CPC ..... E21B 47/10; E21B 47/102; E21B 47/123; E21B 49/10; G01N 27/414; G01V 9/00; G06F 15/00
USPC ............ 702/6; 73/152.55; 166/252.3, 250.01; 356/432, 447, 491; 385/12, 31, 53, 385/102, 107
See application file for complete search history.

(56) References Cited

U.S. PATENT DOCUMENTS

| 2,852,693 A | 9/1958 | Hughes et al. |
|---|---|---|
| 3,722,271 A | 3/1973 | Horvitz |

(Continued)

FOREIGN PATENT DOCUMENTS

| EP | 0 072 627 | 2/1983 |
|---|---|---|
| GB | 2368391 | 1/2002 |

(Continued)

OTHER PUBLICATIONS

Maida, John L., et al., "Downhole Species Selective Optical Fiber Sensor Systems and Methods", U.S. Appl. No. 13/253,788, filed Oct. 5, 2011, 23 pgs.

(Continued)

*Primary Examiner* — John H Le
(74) *Attorney, Agent, or Firm* — Krueger Iselin LLP; Scott H. Brown

(57) ABSTRACT

A disclosed system includes a plurality of ion selective fiber sensors configured to measure treatment concentration variance, and a computer in communication with the plurality of ion selective fiber sensors. The computer determines treatment coverage for different downhole zones using information received from the plurality of ion selective fiber sensors. A disclosed method includes collecting data from a plurality of ion selective fiber sensors configured to measure treatment concentration variance. The method also includes determining treatment coverage for different downhole zones using information received from the plurality of ion selective fiber sensors. A disclosed downhole treatment management system includes a data analysis unit that collects data from a plurality of downhole ion selective fiber sensors configured to measure treatment concentration variance, and that determines treatment coverage for different downhole zones using the collected data. The downhole treatment management system also includes a treatment control interface in communication with the data analysis unit. The treatment control interface updates treatment operations using treatment coverage information determined by the data analysis unit.

24 Claims, 4 Drawing Sheets

(51) Int. Cl.
*E21B 47/10* (2012.01)
*E21B 47/12* (2012.01)

(56) References Cited

U.S. PATENT DOCUMENTS

| | | | |
|---|---|---|---|
| 4,166,216 | A | 8/1979 | Cubberly |
| 4,986,121 | A | 1/1991 | Luscombe |
| 5,037,172 | A | 8/1991 | Hekman et al. |
| 5,351,532 | A | 10/1994 | Hager |
| 5,892,860 | A | 4/1999 | Maron et al. |
| 6,160,762 | A | 12/2000 | Luscombe et al. |
| 6,233,746 | B1 | 5/2001 | Skinner |
| 6,268,911 | B1 | 7/2001 | Tubel et al. |
| 6,408,943 | B1 | 6/2002 | Schultz et al. |
| 6,522,797 | B1 | 2/2003 | Siems et al. |
| 6,591,025 | B1 | 7/2003 | Siems et al. |
| 6,731,389 | B2 | 5/2004 | Luscombe et al. |
| 6,847,034 | B2 | 1/2005 | Shah et al. |
| 6,853,604 | B2 | 2/2005 | Spackman et al. |
| 6,891,606 | B2 | 5/2005 | Smith et al. |
| 6,931,188 | B2 | 8/2005 | Kersey et al. |
| 7,028,773 | B2 | 4/2006 | Fujisawa et al. |
| 7,095,012 | B2 | 8/2006 | Fujisawa et al. |
| 7,163,055 | B2 | 1/2007 | Coon et al. |
| 7,216,710 | B2 | 5/2007 | Welton et al. |
| 7,219,729 | B2 | 5/2007 | Bostick, III et al. |
| 7,409,858 | B2 | 8/2008 | Dria et al. |
| 7,461,547 | B2 | 12/2008 | Terabayashi et al. |
| 7,511,823 | B2 | 3/2009 | Schultz et al. |
| 7,641,395 | B2 | 1/2010 | Ringgenberg et al. |
| 7,665,543 | B2 | 2/2010 | Bostick, III et al. |
| 7,669,440 | B2 | 3/2010 | Kersey et al. |
| 7,733,490 | B2 | 6/2010 | Goodwin et al. |
| 7,864,321 | B2 | 1/2011 | Caron et al. |
| 8,104,338 | B2 | 1/2012 | Difoggio |
| 8,135,541 | B2 | 3/2012 | Davis et al. |
| 8,230,916 | B2 | 7/2012 | Sumrall et al. |
| 2003/0095263 | A1 | 5/2003 | Varshneya et al. |
| 2003/0205375 | A1 | 11/2003 | Wright et al. |
| 2003/0210403 | A1 | 11/2003 | Luscombe et al. |
| 2004/0113104 | A1 | 6/2004 | Maida et al. |
| 2004/0141420 | A1 | 7/2004 | Hardage et al. |
| 2004/0163809 | A1 | 8/2004 | Mayeu et al. |
| 2005/0207279 | A1 | 9/2005 | Chemali et al. |
| 2005/0263281 | A1 | 12/2005 | Lovell et al. |
| 2006/0010973 | A1 | 1/2006 | Brown |
| 2006/0018611 | A1 | 1/2006 | Maida |
| 2006/0081412 | A1 | 4/2006 | Wright et al. |
| 2006/0215974 | A1 | 9/2006 | Maida |
| 2007/0010404 | A1 | 1/2007 | Welton et al. |
| 2007/0095528 | A1* | 5/2007 | Ziauddin et al. ........... 166/252.3 |
| 2007/0187648 | A1 | 8/2007 | Welton et al. |
| 2007/0193351 | A1 | 8/2007 | DiFoggio |
| 2008/0073084 | A1 | 3/2008 | Ringgenberg et al. |
| 2008/0227669 | A1 | 9/2008 | Welton |
| 2008/0280789 | A1 | 11/2008 | Welton et al. |
| 2008/0314139 | A1* | 12/2008 | DiFoggio ................... 73/152.55 |
| 2009/0143258 | A1 | 6/2009 | Welton et al. |
| 2009/0271115 | A1 | 10/2009 | Davis et al. |
| 2010/0158435 | A1 | 6/2010 | Kersey et al. |
| 2010/0177310 | A1 | 7/2010 | Difoggio |
| 2010/0269579 | A1 | 10/2010 | Lawrence et al. |
| 2011/0090496 | A1 | 4/2011 | Samson et al. |
| 2011/0100629 | A1 | 5/2011 | Welton et al. |
| 2011/0105368 | A1 | 5/2011 | Welton et al. |
| 2011/0116099 | A1 | 5/2011 | Spross et al. |
| 2011/0297372 | A1 | 12/2011 | Maida et al. |
| 2011/0308788 | A1 | 12/2011 | Ravi et al. |
| 2012/0013893 | A1 | 1/2012 | Maida et al. |
| 2012/0126993 | A1 | 5/2012 | Samson et al. |
| 2012/0205103 | A1 | 8/2012 | Ravi et al. |
| 2012/0257475 | A1 | 10/2012 | Luscombe et al. |
| 2013/0031970 | A1 | 2/2013 | Freese et al. |
| 2013/0087328 | A1 | 4/2013 | Maida, Jr. et al. |
| 2013/0245947 | A1 | 9/2013 | Samson et al. |
| 2013/0332130 | A1 | 12/2013 | Loveless et al. |

FOREIGN PATENT DOCUMENTS

| | | |
|---|---|---|
| GB | 2 445 209 | 2/2008 |
| WO | WO-98/50680 | 11/1998 |
| WO | WO-98/57030 | 12/1998 |
| WO | WO-01/81914 | 11/2001 |
| WO | WO-2006/063094 | 6/2006 |
| WO | WO-2008/081467 | 7/2008 |
| WO | WO-2013/052891 A3 | 4/2013 |
| WO | WO-2013/137992 | 9/2013 |
| WO | WO-2014/099055 | 6/2014 |

OTHER PUBLICATIONS

Maida, John L., et al., "Optical Casing Collar Locator Systems and Methods", U.S. Appl. No. 13/226,578, filed Sep. 7, 2011, 30 pgs.

Samson, Etienne M., et al., "Downhole Systems and Methods for Water Source Determination", U.S. Appl. No. 13/418,455, filed Mar. 13, 2012, 27 pgs.

Sharp, David P., et al., "Casing Collar Locator with Wireless Telemetry Support", U.S. Appl. No. 13/426,414, filed May 21, 2012, 30 pgs.

Skinner, Neal G., et al., "Downhole Time Domain Reflectometry with Optical Components", U.S. Appl. No. 13/655,607, filed Oct. 19, 2012, 32 pgs.

"Au Patent Examination Report No. 1", dated Jun. 3, 2015, Appl No. 2013232590, "Downhole Systems and Methods for Water Source Determination," filed Feb. 6, 2013, 4 pgs.

"International Preliminary Report on Patentability", dated Jun. 23, 2014, Appl No. PCT/US2013/024845, "Downhole system and methods for water source determination," filed Feb. 6, 2013, 9 pgs.

"Non-final Office Action", dated Feb. 28, 2014, U.S. Appl. No. 13/253,788, "Downhole Species Selective Optical Fiber Sensor Systems and Methods," filed Oct. 5, 2011, 19 pgs.

"PCT International Preliminary Report on Patentability", dated Sep. 26, 2013, Appl No. PCT/US2012/059091, "Downhole Species Selective Optical Fiber Sensor Systems and Methods", filed Oct. 5, 2012, 27 pgs.

"PCT International Preliminary Report on Patentability", dated Jul. 2, 2015, Appl No. PCT/US2013/058128, "Downhole Treatment Monitoring Systems and Methods Using Ion Selective Fiber Sensors," filed Sep. 5, 2013, 8 pgs.

"PCT International Search Report and Written Opinion", dated Apr. 4, 2013, Appl No. PCT/US2012/059091, "Downhole Species Selective Optical Fiber Sensor Systems and Methods", filed Oct. 5, 2012, 27 pgs.

"PCT International Search Report and Written Opinion", dated Sep. 29, 2009, Appl No. PCT/US2009/053492, A Near-Field Electromagnetic Communications Network for Downhole Telemetry, filed Aug. 11, 2009, 7 pgs.

"PCT Written Opinion", dated Feb. 24, 2014, Appl No. PCT/US2013/058128, "Downhole Treatment Monitoring Systems and Methods Using Ion Selective Fiber Sensors," filed Sep. 5, 2013, 14 pgs.

"Search report and written opinion", dated Jan. 16, 2014, Appl No. PCT/US2013/024845, "Downhole system and methods for water source determination," filed Feb. 6, 2013, 12 pgs.

"US Application", dated Mar. 13, 2012, U.S. Appl. No. 13/418,455, "Downhole Systems and Methods for Water Source Determination", filed Mar. 13, 2012, 24 pgs.

"US Final Office Action", dated Jul. 31, 2015, U.S. Appl. No. 13/253,788, "Downhole Species Selective Optical Fiber Sensor Systems and Methods," filed Oct. 5, 2011, 14 pgs.

"US Final Office Action", dated Jun. 26, 2014, U.S. Appl. No. 13/253,788, "Downhole Species Selective Optical Fiber Sensor Systems and Methods," filed Oct. 5, 2011, 12 pgs.

"US Non Final Office Action", dated Apr. 23, 2015, U.S. Appl. No. 2013/418,455, "Downhole Systems and Methods for Water Source Determination," filed Mar. 13, 2012, 26 pgs.

(56) References Cited

OTHER PUBLICATIONS

"US Non-Final Office Action", dated Jan. 30, 2015, U.S. Appl. No. 13/253,788, "Downhole Species Selective Optical Fiber Sensor Systems and Methods," filed Oct. 5, 2011, 16 pgs.

"US Non-Final Office Action", dated Sep. 18, 2013, U.S. Appl. No. 13/253,788, "Downhole Species Selective Optical Fiber Sensor Systems and Methods", filed Oct. 5, 2011, 13 pgs.

Dessy, Raymond E., "Waveguides as Chemical Sensors", Analytical Chemistry, vol. 61, No. 19, Oct 1, 1989, pp. 1079A-1094A, ACS Publications, Washington, DC, 14 pgs.

Fan, Chunfang et al., "Scale Prediction and Inhibition for Unconventional Oil and Gas Production", SPE 130690, SPE International Conference on Oilfield Scale, Aberdeen, United Kingdom, May 26-27, 2010, pp. 1-22.

Hirschfeld, Tomas et al., "Feasibility of using fiber optics for monitoring groundwater contaminants", Optical Engineering XP-002692941, vol. 22 No. 5, Sep.-Oct. 1983, pp. 527-531.

Kohler, N. et al., "Static and Dynamic Evaluation of Calcium Carbonate Scale Formation and Inhibition", SPE 68963, SPE European Formation Damage Conference, The Hague, The Netherlands, May 21-22, 2001, pp. 1-11.

Martins-Filho, Joaquim F., et al., "Optical Fibre Sensor System for Multipoint Corrosion Detection", Optical Fiber New Developments, Christophe Lethien (Ed.), ISBN: 978-953-7619-50-3, InTech, DOI: 10.5772/7579. Available from: http://www.intechopen.com/books/optical-fiber-new-developments/optical-fibre-sensor-system-for-multipoint-corrosion-detection, Dec. 1, 2009, pp. 36-42.

Pitcher, R. J., et al., "Optothermal Drive of Silicon Resonators: The Influence of Surface Coatings", Sensors and Actuators, A21-23, 1990, pp. 387-390.

Putty, Michael W., et al., "Process Integration for Active Polysilicon Resonant Microstructures", Sensors and Actuators, 20, 1989, pp. 143-151.

Ravi, Kris et al., "Cement Slurry Monitoring", U.S. Appl. No. 13/028,542, filed Feb. 16, 2011, 19 pgs.

Renaud, Nathalie "Ion-Selective Optical Fiber", Dec. 7, 2012, XP055101868 [retrieved from: www.ino.ca/media/55951/ion-selective-optical-fiber.pdf], 1 pg.

* cited by examiner

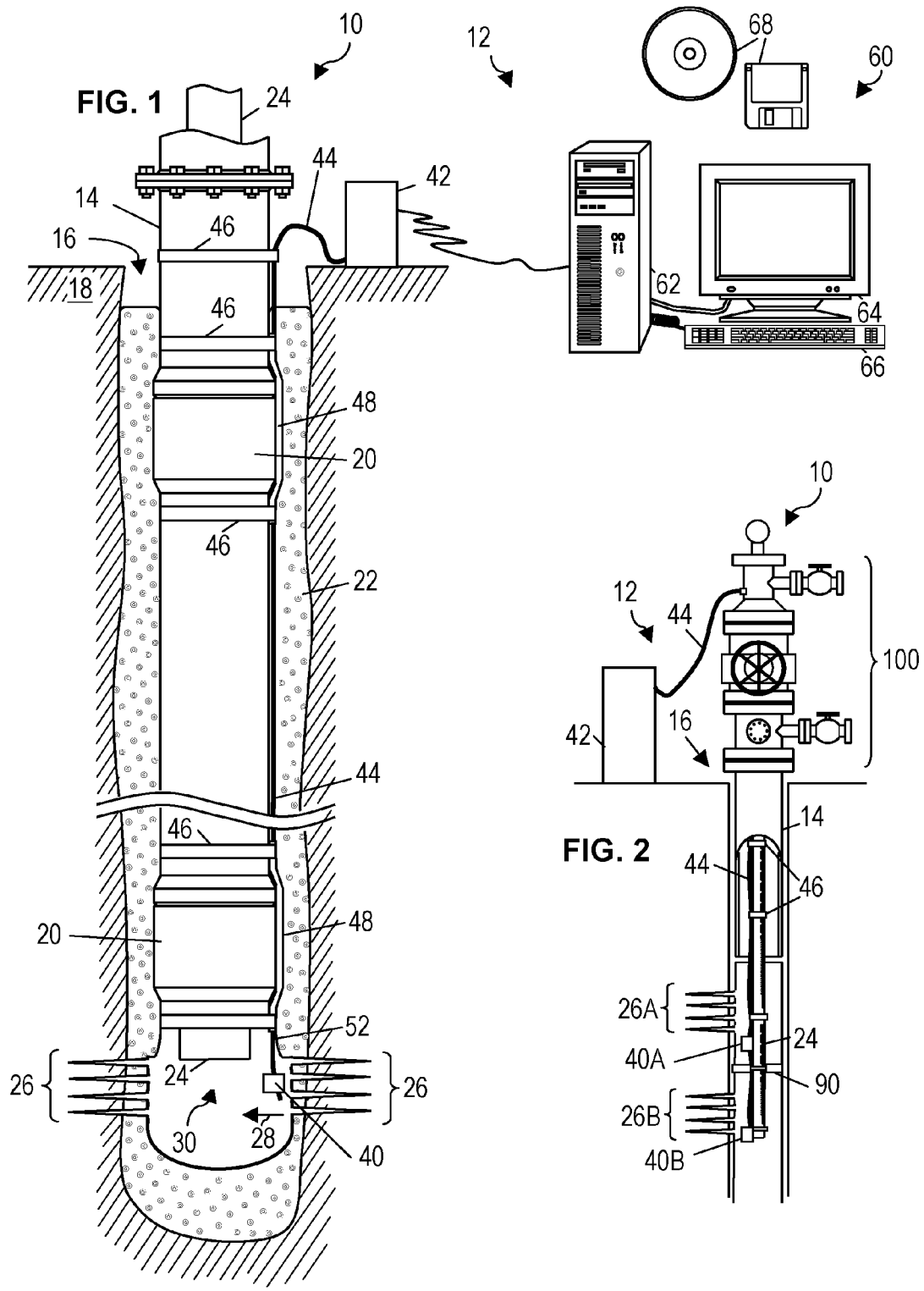

DOWNHOLE TREATMENT MONITORING SYSTEMS AND METHODS USING ION SELECTIVE FIBER SENSORS

BACKGROUND

After a wellbore has been drilled, the wellbore typically is cased by inserting lengths of steel pipe ("casing sections") connected end-to-end into the wellbore. Threaded exterior rings called couplings are typically used to connect adjacent ends of the casing sections at casing joints. The result is a "casing string" including casing sections and couplers that extends from the surface to a bottom of the wellbore. The casing string is then cemented in place to complete the casing operation. After a wellbore is cased, the casing is often perforated to provide access to one or more desired formations, e.g., to enable fluid from the formation(s) to enter the wellbore.

Treatments may be applied to a formation to increase or inhibit flow. However, proper application of treatments is difficult. As an example, when acid is injected in a formation, most of the acid goes to the zone nearest to the injection point and leaves most of the formation untreated. Thus, high permeability zones that are treated become over-stimulated. In particular, the problem arises for long horizontal wells, where the heel of the well becomes over-stimulated while the toe of the well is under-stimulated.

Distributed temperature sensing (DTS) technology has been employed to monitor fluid injection since the formation and the injected fluids are at different temperatures. However, formation characteristics such as thief zones, cross-flow across producing zones, depth of investigation, geothermal gradient, and presence of water zones decrease the level of confidence in DTS interpretation. There exists a need for improved systems or methods for treatment monitoring.

BRIEF DESCRIPTION OF THE DRAWINGS

Accordingly, there are disclosed in the drawings and the following description various downhole treatment monitoring systems and methods using ion selective fiber sensors. In the drawings:

FIG. 1 is a side elevation view of an illustrative downhole treatment sensing system in a production well.

FIG. 2 shows an alternative downhole treatment sensing system.

Figure 3:
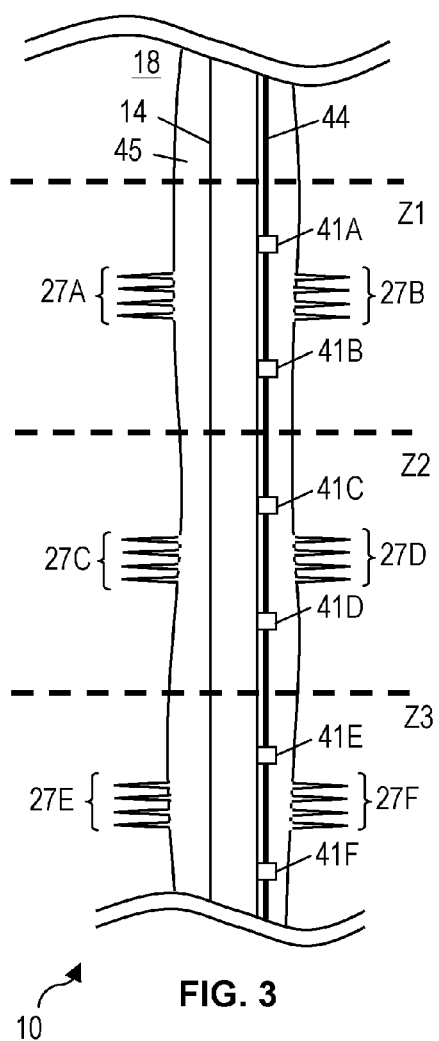
FIG. 3 shows a distribution of zoned ion selective fiber sensors in a production well.

It should be understood, however, that the specific embodiments given in the drawings and detailed description thereof do not limit the disclosure. On the contrary, they provide the foundation for one of ordinary skill to discern the alternative forms, equivalents, and modifications that are encompassed in the scope of the appended claims.

Nomenclature

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

The term "treatment coverage" is intended to mean a two-dimensional or three-dimensional mapping of treatment location and/or flow patterns. Treatment coverage may be associated with a specific moment in time or to a longer time interval.

DETAILED DESCRIPTION

Disclosed herein are downhole treatment monitoring systems and methods using ion selective fiber (ISF) technology. For example, a disclosed system includes a plurality of ion selective fiber sensors configured to detect treatment presence. A computer in communication with the plurality of ion selective fiber sensors determines treatment coverage for different downhole zones based on information collected from the plurality of ion selective fiber sensors. In some embodiments, down whole ISF sensors are distributed among different zones of interest to measure the concentration variance of reactive species (e.g., H+ ions) and/or reaction products (e.g., $CaCl_2$, $MgCl_2$) to determine the reaction/fluid fronts along the formation face inside the wellbore. With such a system, real-time treatment flow profiling and zonal coverage monitoring is possible. The disclosed systems and methods can be applied to openhole and cased/perforated scenarios.

Turning now to the figures, FIG. 1 shows a production well 10 equipped with an illustrative downhole treatment monitoring system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections (usually about 30 foot long) connected end-to-end by couplings 20. Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to the surface of the earth 18. Perforations 26 have been formed at a bottom of the borehole 16 to facilitate the flow of a fluid 28 from a surrounding formation (i.e., a "formation fluid") into the borehole and thence to the surface via an opening 30 at the bottom of the production tubing string 24. Though only one perforated zone is shown, many production wells may have multiple such zones, e.g., to produce fluids from different formations.

As described in more detail below, the downhole treatment monitoring system 12 is adapted to detect concentration variance of one or more chemical species in one or more downhole zones. For example, the detectable chemical species may correspond to treatment reactants, treatment results, or tracer ions included with a treatment. Various chemical species can be detected including sodium, potassium, magnesium, calcium hydroxide, and calcium fluoride. The downhole treatment monitoring system 12 makes it possible to determine treatment coverage over time in one or more zones of interest.

In the embodiment of FIG. 1, the downhole treatment monitoring system 12 includes an ISF sensor 50 in contact with the fluid 28 at the bottom of the borehole 16 and coupled to an interface 42 via a fiber optic cable or waveguide 44. As an example, the fiber optic cable 44 may be low-loss silica fiber with a transmission band between approximately 1000 nm-1750 nm. The interface 42 may be located on the surface of the earth 18 near the wellhead, i.e., a "surface interface". The ISF sensor 40 includes a waveguide and is adapted to alter light passing through the waveguide dependent upon a concentration of one or more chemical species in the fluid 28.

In the embodiment of FIG. 1, the fiber optic cable 44 extends along an outer surface of the casing string 14 and is held against the outer surface of the of the casing string 14 at spaced apart locations by multiple bands 46 that extend around the casing string 14. A protective covering 48 may be installed over the fiber optic cable 44 at each of the couplings of the casing string 14 to prevent the cable from being pinched or sheared by the coupling's contact with the borehole wall. Such protective coverings 48 may be held in place by two of the bands 46 installed on either side of coupling 20.

In at least some embodiments, the fiber optic cable 44 terminates at surface interface 42 with an optical port adapted for coupling the fiber optic cable to a light source and a detector. The light source transmits light along the fiber optic cable to the ISF sensor 40, which alters the light to provide some indication of a given chemical species concentration. The ISF sensor 40 returns light along the fiber optic cable to the surface interface 42 where the optical port presents this modified light to the detector. The detector responsively produces an electrical output signal indicative of the concentration of the given chemical species in the produced fluid 28. The optical port may be configured to communicate the down-going light signal along one or more optical fibers that are different from the optical fibers carrying the return light signal, or may be configured to use the same optical fibers for communicating both light signals.

The illustrative downhole treatment monitoring system 12 of FIG. 1 further includes a computer 60 coupled to the surface interface 42 to control the light source and detector. The illustrated computer 60 includes a chassis 62, an output device 64 (e.g., a monitor as shown in FIG. 1, or a printer), an input device 66 (e.g., a keyboard), and information storage media 68 (e.g., magnetic or optical data storage disks). However, the computer may be implemented in different forms including, e.g., an embedded computer permanently installed as part of the surface interface 42, a portable computer that is plugged into the surface interface 42 as desired to collect data, a remote desktop computer coupled to the surface interface 42 via a wireless link and/or a wired computer network, a mobile phone/PDA, or indeed any electronic device having a programmable processor and an interface for I/O.

In some embodiments, the ISF sensor 40 alters incoming light to provide an indication of a concentration of one or more selected chemical species (i.e., one or more selected analytes) related to injected treatment reactants or reaction results. The computer 60 receives electrical output signals produced by the surface interface 42 that correspond to altered light, calculates a measured concentration of treatment reactants or reaction results based on the received output signal, and determines a treatment coverage for one or more zones based on the determined concentration of treatment reactants or reaction results. The computer 60 also may display results including treatment coverage over time for one or more zones. Further, the computer 60 may update a treatment plan or treatment model based on the determined treatment coverage for one or more downhole zones.

In some embodiments, the information storage media 68 stores a software program for execution by computer 60. The instructions of the software program may cause the computer 60 to collect information regarding downhole conditions including selected analyte concentration(s) derived from the electrical signal from surface interface 42 and, based at least in part thereon, to determine treatment coverage for at least one downhole zone. Further, the software program may cause the computer 60 to display results including treatment coverage over time for one or more zones. Further, the software program may cause the computer 60 to update a treatment plan or treatment model based on the determined treatment coverage for one or more downhole zones.

FIG. 2 shows an alternative embodiment of a downhole treatment monitoring system 12, where the fiber optic cable 44 is strapped to the outside of the production tubing 24 rather than the outside of casing 14. Two perforations 26A and 26B have been created in the borehole 16 to facilitate the obtaining of formation fluids from two different zones. Formation fluid from a first of the two zones enters the casing string 24 via the perforation 26A, and formation fluid from the other zone enters the production tubing string 24 via the perforation 26B. A packer 90 seals an annulus around the production tubing string 24 and defines two different zones. A first ISF sensor 40A is positioned on one side of the packer 90 adjacent the perforation 26A, and a second ISF sensor 40B is positioned on an opposite side of the packer 90 adjacent the perforation 26B. The ISF sensor 40A enables treatment detection in the fluid from the first zone, and the sensor 40B enables treatment detection the fluid from the other zone.

In the embodiment of FIG. 2, the ISF sensors 40A and 40B are both coupled to the surface interface 42 via the fiber optic cable 44. The fiber optic cable 44 exits through an appropriate port in a "Christmas tree" 100, i.e., an assembly of valves, spools, and fittings connected to a top of a well to direct and control a flow of fluids to and from the well. The fiber optic cable 44 extends along the outer surface of the production tubing string 24, and is held against the outer surface of the production tubing string 24 at spaced apart locations by multiple bands 46 that extend around the production tubing string 24. In other embodiments, the ISF sensors 40A and 40B may be coupled to the surface interface 42 via different fiber optic cables.

FIG. 3 shows a distribution of zoned ISF sensors along a section of a well 10. The zones (Z1-Z3) may be created by any known zoning mechanism. In some embodiments, Z1-Z3 are connected along an annular 45 between casing string 14 and formation 18. As shown, one or more fiber optic cables 44 may extend to the zones to enable sense operations as described herein. Sense operations may monitor treatment coverage near perforations 27A and 27B of Z1, near perforations 27C and 27D of Z2, or near perforations 27D and 27E of Z3. More specifically, ISF sensors 41A and 41B may perform sense operations for Z1, ISF sensors 41C and 41D may perform sense operations for Z2, and ISF sensors 41E and 41F may perform sense operations for Z3. Having multiple ISF sensors for each zone as in FIG. 3 enables higher resolution treatment coverage estimates to be made. Further, use of multiple ISF sensors for each zone may enable different chemical species to be detected, which improves treatment coverage interpretation and analysis. In different embodiments, zones may vary with respect to size, the number of perforations, and/or the number of ISF sensors.

Figure 4:
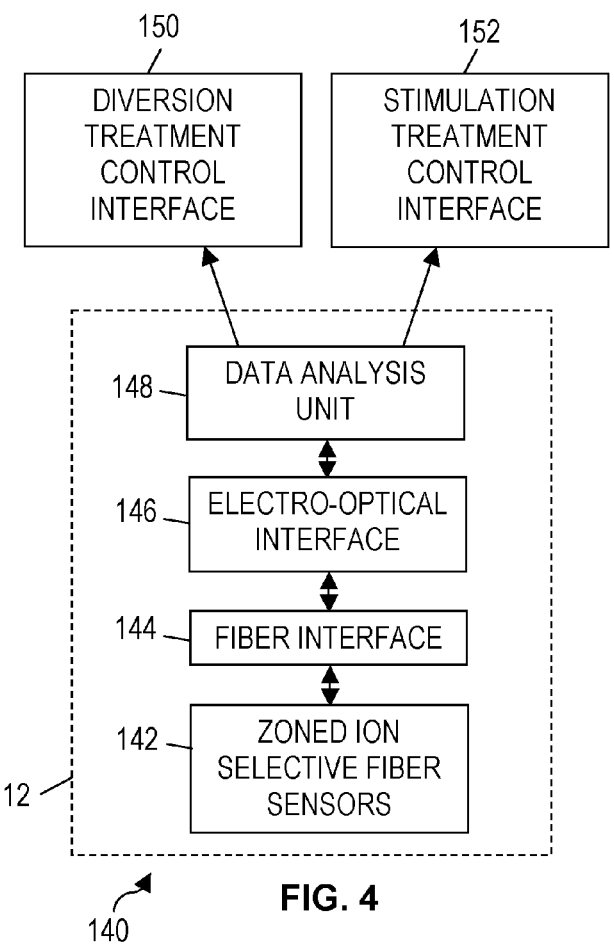
FIG. 4 shows a block diagram of a treatment management system.

FIG. 4 shows a block diagram of a treatment management system 140. As shown, the treatment management system 140 may include a diversion treatment control interface 150 and a stimulation treatment control interface 152. The diversion treatment control interface 150 may be employed to carry out ongoing or future diversion treatments that inhibit fluid flow. In some embodiments, the diversion treatment control interface 150 employs a computer or programmable logic to implement a diversion treatment plan or model. The operations of the diversion treatment control interface 150 may be automated in accordance with the plan or model. Alternatively, the plan or model may enable an operator to select or adjust diversion treatment options.

Similarly, the stimulation treatment control interface 152 may be employed to carry out ongoing or future stimulation treatments that increase fluid flow. In some embodiments, the stimulation treatment control interface 152 employs a computer or programmable logic to implement a stimulation treatment plan or model. The operations of the stimulation treatment control interface 152 may be automated in accordance with the plan or model. Alternatively, the plan or model may enable an operator to select or adjust stimulation treatment options. In some embodiments, the stimulation treatment control interface 152 and the diversion treatment control interface 152 are integrated together.

As shown, the diversion treatment control interface 150 and the stimulation treatment control interface 152 are in communication with a downhole treatment monitoring system 12 that includes zoned ISF sensors 142, a fiber interface 144, an electro-optical interface 146, and a data analysis unit 148. The downhole treatment monitoring system 12 operates by probing the zoned ISF sensors 142 as described herein to accumulate information that indicates the concentration of chemicals related to treatments. With the accumulated information and with sensor location information, the data analysis unit 148 is able to determine a treatment coverage for on an ongoing treatment. The diversion treatment control interface 150 and/or the stimulation treatment control interface 152 receive treatment coverage updates from the data analysis unit 148. In response, the diversion treatment control interface 150 may update diversion treatment operations for a current treatment, or may update plans or models applicable to future diversion treatments. Similarly, the stimulation treatment control interface 152 may update simulation treatment operations, or may update plans or models applicable to future stimulation treatments.

Figure 5A:
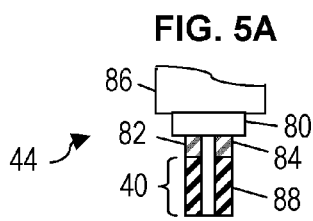
FIGS. 5A and 5B show illustrative ion selective fiber sensors.
Figure 5B:
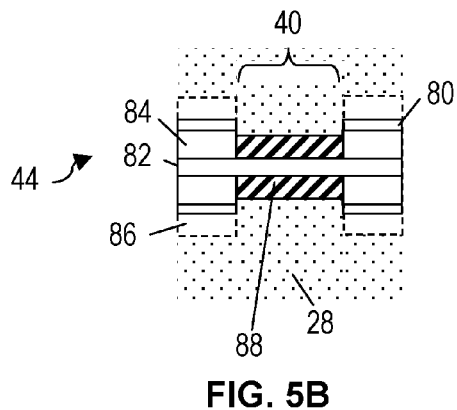

FIG. 5A is an enlarged diagram of an illustrative tip of fiber optic cable 44 with an ISF sensor 40. Similarly, FIG. 5B is an enlarged diagram of an illustrative section of fiber optic cable 44 with an ISF sensor 40. In the embodiments of FIGS. 5A and 5B, the fiber optic cable 44 includes at least one optical fiber 80 that can be exposed by pulling back or removing the cable sheath. The optical fiber 80 includes a substantially transparent inner core 82 surrounded by a substantially transparent cladding layer 84 having a higher index of refraction, which causes the inner core 82 to serve as a waveguide. The cladding layer 84 is in turn surrounded by one or more protective layers 86 that prevents external gases from degrading the performance of the optical fiber.

The mechanism of measuring ionic concentration in fluid is by determining the absorption spectra of the ions in the fluid. Is some embodiments, the fiber optic cable 44 includes an inner core 82 that is polymetric and a cladding layer 84 that is plasticized polymetric with a dye-indicator embedded in the cladding membrane. The cladding layer 84 is designed to be permeable to specific ions in the fluid. Once the cladding-specific ions enter the cladding, ion-exchange with the dye occurs and protons are released in the solution. As an example, the concentration of the ions (e.g., $H^+$) may be measured to determine the pH of the surrounding fluid.

More specifically, the optical fiber 80 is provided with a reagent region 88 that, at least in some embodiments, is an exposed portion of the cladding layer 84 that may be further enhanced with a reagent designed to complex with a given chemical species in solution. The reagent region 88 of the ISF sensor 40 surrounds the inner core 82 (i.e., the waveguide) and is in direct contact with both the waveguide and the fluid 28 (see FIG. 1). The reagent region 88 may, for example, change color (i.e., changes its light absorption spectrum) when it complexes with a chemical species in fluid 28. The reagent may be or include, for example, a chromoionophore that complexes with ions of a selected chemical species such as, $H^+$, $CaCl_2$, or $MgCl_2$. The reagent may be suspended in or chemical bound to a medium that confines the reagent to the reagent region 88, yet enables the given chemical species to diffuse to or from the surrounding fluid in accordance with the concentration in that fluid. (See, for example, U.S. Pat. No. 7,864,321.)

Within the ISF sensor 40, a portion of the light passing through the inner core 82 (i.e., the waveguide) expectedly interacts with the reagent region 88. When the reagent complexes with a chemical species in the fluid 28, the complexes may more strongly or more weakly absorb the particular wavelength of light traveling through the reagent region 88. As a result, the intensity of the light exiting the optical sensor 40 may be reduced dependent upon the concentration of the chemical species in the fluid 28. Again, the chemical species may be selected based on its known presence in injected treatments or treatment results.

In at least some embodiments of the downhole treatment monitoring system 12, a light source in the surface interface 42 provides pulses of light via an optical port to the optical fiber 80 of the fiber optic cable 44. The light has, or includes, one or more wavelengths that are absorbed in the reagent region 88 of the optical sensor 40 when the reagent complexes with a selected analyte in the fluid 28. The light may be or include, for example, near infrared light. When a light pulse reaches the ISF sensor 40, the light passes through the ISF sensor 40 and is altered (e.g., attenuated) within the reagent region 88 by an amount dependent on the concentration of the selected analyte in the fluid 28.

The light traveling through the ISF sensor 40 may be routed back to the surface along a different optical fiber in cable 44 or the same fiber in cable 44. In the embodiment of FIG. 5B, the light traveling through ISF sensor 40 may be altered once or twice (depending on whether the ISF sensor 40 of FIG. 5B is part of a transmissive loop architecture or a reflective architecture as will be described briefly in FIGS. 6A-6D). In the embodiment of FIG. 5A, the ISF sensor 40 is part of a reflective architecture and the light travels through the ISF sensor 40 twice as it reaches an end of the inner core 82 and is reflected. (The end of the inner core 82 may be polished or mirrored to reflect a substantial portion of the light incident on it.) Regardless of whether light passes through ISF sensor 40 once or twice, the light pulse is altered (e.g., attenuated) within the reagent region 88 dependent upon the concentration of the selected chemical species in the fluid 28. The altered pulse of light travels back through the optical fiber 80 of the fiber optic cable 44 (or via another fiber) to the surface interface 42. A light detector in the surface interface 42 receives the reflected pulse of light and produces the electrical output signal indicative of the concentration of the selected chemical species in the fluid 28. For example, the detected intensity of the received light pulse at a given frequency may be proportional to the concentration of the given species.

Alternatively, the detected intensity may be a nonlinear function of the transmitted light intensity and the concentration of the given species, but the surface interface or the computer is provided with sufficient information to derive the desired concentration measurement.

It is noted that multiple ISF sensors can be co-located to sense multiple analytes to better characterize the fluid 28. ISF sensors can also be deployed in multiple zones to sense fluids from different formations.

Figure 6A:
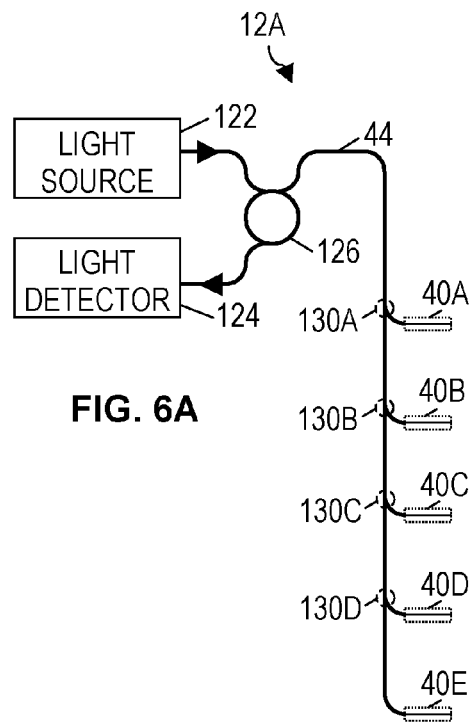
FIGS. 6A-6D show various architectures for downhole treatment monitoring systems.
Figure 6B:
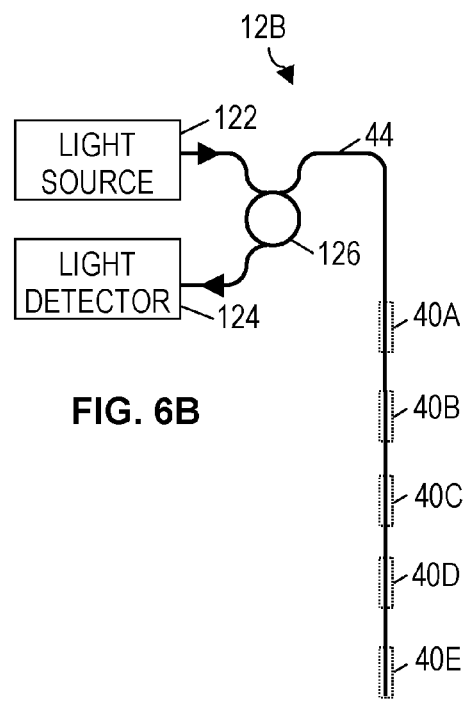
Figure 6C:
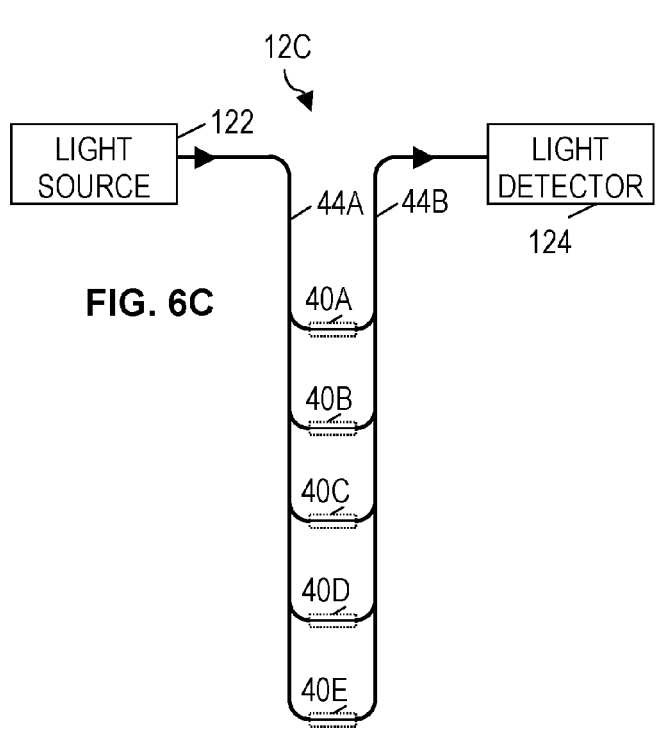
Figure 6D:
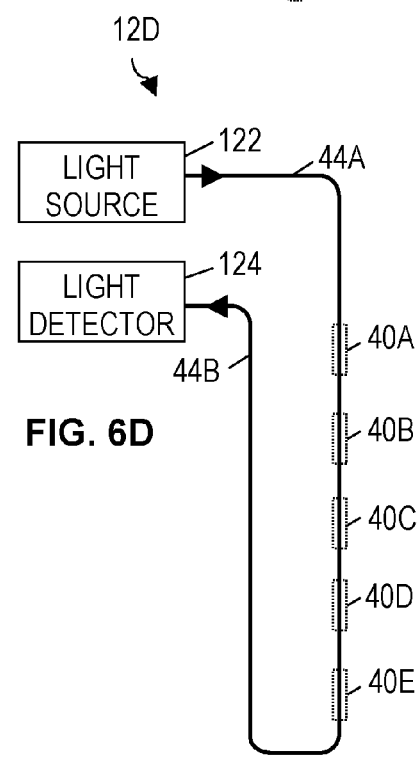

FIGS. 6A-6D show various architectures for downhole treatment monitoring systems 12A-12D with multiple spaced-apart ISF sensors 40A-40E, referred to collectively as the ISF sensors 40. Placed in contact with a fluid each of the ISF sensors 40 may be adapted to alter light passing therethrough dependent upon a concentration of one or more chemical species in the fluid as described herein. FIGS. 6A and 6B show reflective fiber architectures, in which light altered by the ISF sensors 40 is reflected back to the surface. In FIG. 6A, ISF sensors 40A-40E may be arranged as shown FIG. 5A (i.e., a termination sensor arrangement). In FIG. 6B, ISF sensor 40E is arranged as shown for FIG. 5A, while ISF sensors 40A-40D are arranged as shown for FIG. 5B (i.e., an in-line sensor arrangement). FIGS. 6C and 6D show transmissive fiber architectures, in which light altered by the ISF sensors 40 propagates along a fiber interface back to the surface without being reflected. In FIGS. 6C and 6D, ISF sensors 40A-40E are arranged as shown for FIG. 5B (i.e., an in-line sensor arrangement).

In the downhole treatment monitoring systems 12A-12D of FIGS. 6A-6D, light never leaves the inner core 82 or cladding layer 84 of fiber optic cable 44 (cf. FIGS. 5A and 5B). Thus, the disclosed fiber sensing approach is intrinsic to the cladding layer 84. In other words, the inner core 82 only transmits the source light and conveys the resulting spectrally-altered light back to the surface. Thus, optical sensing or probing of the ion transfer sensitive dye only takes place within a relatively thin layer of the cladding layer 84, whereby the unaltered or altered dye molecules are allowed to interact with evanescent field optical probe light.

In FIG. 6A, a surface interface for the downhole treatment monitoring system 12A includes a light source 122, a light detector 124, and an optical circulator 126 that couples the source and detector to fiber optic cable 44. Optical splitters 130A-130D couple the optical fiber to corresponding ISF sensors 40A-40D, and a last ISF sensor 40E may be coupled to the terminal end of the optical fiber. The optical circulator 126 routes pulses of light from light source 122 to the optical fiber in fiber optic cable 44. Each pulse of light propagates along the optical fiber to the series of optical splitters 130A-130D. Each splitter directs a portion of the light (e.g., 2%) to the corresponding sensor and passes the remainder of the light along the cable 44. Each ISF sensor 40A-40E alters (e.g., attenuates) the light in accordance with the concentration of the selected chemical species and reflects back the altered light. The optical splitters 130A-130D recombine the reflected light into a single beam propagating upward along the fiber optic cable 44. Due to the travel-time differences, the light propagating upward now consists of a series of pulses, the first pulse corresponding to the first sensor 40A, the second pulse corresponding to the second sensor 40B, etc. The optical circulator 126 directs these pulses to the light detector 124 which determines a sensor measurement for each pulse.

Where the fiber optic cable 44 includes multiple optical fibers or multi-stranded optical fibers, the optical sensors 40A-40E can be directly coupled to different ones of the optical fibers or strands. The optical splitters would not be needed in this variation. The detector 124 can be coupled to measure the total light returned along the multiple fibers or strands, as the travel time difference to the various sensors will convert the transmitted light pulse into a series of reflected light pulses, with each pulse representing a corresponding ISF sensor measurement.

In some embodiments, light is passed through the fiber optic cable 44 remotely from the light source 122 and the optical absorbance spectrum of dye with the ion absorbed on it is obtained by evanescent optical field waves propagating within the cladding layer 84. The change in absorption spectra of the initial dye (before ion exchange) and the ion-exchanged dye, and the shape of the final absorption spectrum is used to calculate the concentration of the ions absorbed.

In the embodiment of FIG. 6B, the downhole optical sensor system 12 also includes the light source 122, the light detector 124, and the optical circulator 126 as before. The optical sensors 120 are positioned in series along the fiber optic cable 44. Each of the ISF sensors 40 is adapted to alter (e.g., attenuate) light in a distinct range of wavelengths (i.e., band of frequencies) such that the ISF sensors 40 alter light in different wavelength ranges (i.e., frequency bands) while leaving the other wavelengths largely unaffected.

The light source 122 may produce light having components in each of the wavelength ranges corresponding to the ISF sensors 40. As the light propagates along the fiber optic cable and through the ISF sensors 40, each of the optical sensors alter the light components within their associated wavelength range. In the illustrated embodiment, the light reflects from the end of the cable and propagates back to the surface, passing a second time through each of the sensors which further alter (e.g., attenuate) the light component in their associated wavelength range. When the reflected light reaches the surface interface, the optical circulator 126 directs the reflected light to the light detector 124, which analyzes each of the wavelength ranges associated with the various sensors 120 to determine a measurement for each sensor.

The embodiment shown in FIG. 6C is similar to the embodiment of FIG. 6A. Rather than using a single optical fiber for both downward-going and upward-going light, however, the embodiment of FIG. 6C separates the downward-going light path 44A from the upward-going light path 44B. Though both paths may be contained in a single fiber optic cable, the two light paths are carried on separate fibers. Light pulses from source 122 travel downward on path 44A, are distributed to the ISF sensors 40 as provided previously, and reach the detector 124 via path 44B. Travel time differences will produce a series of light pulses at the detector, each pulse corresponding to a different ISF sensor. Alternatively, or in addition, the ISF sensors may operate in different wavelength bands and the sensor measurements may be distinguished accordingly.

The embodiment of FIG. 6D is similar to embodiment of FIG. 6B. Rather than using a single optical fiber for both downward-going and upward-going light, however, the embodiment of FIG. 6D separates the downward-going light path 44A from the upward-going light path 44B. Light pulses from source 122 travel downward on path 44A, are distributed to the ISF sensors 40 as provided previously, and reach the detector 124 via path 44B.

In some embodiments of FIGS. 6A-6D, light is passed through the fiber optic cable 44 remotely from the light source 122 and the optical absorbance spectrum of dye with the ion(s) adsorbed on or absorbed within the dye is obtained by evanescent optical field waves propagating within the cladding layer 84 (cf. FIGS. 5A and 5B). The change in absorption spectra of the initial dye (before ion exchange) and the ion-exchanged dye, and the shape of the final absorption spectrum is used to calculate the concentration of the ions absorbed.

Figure 7:
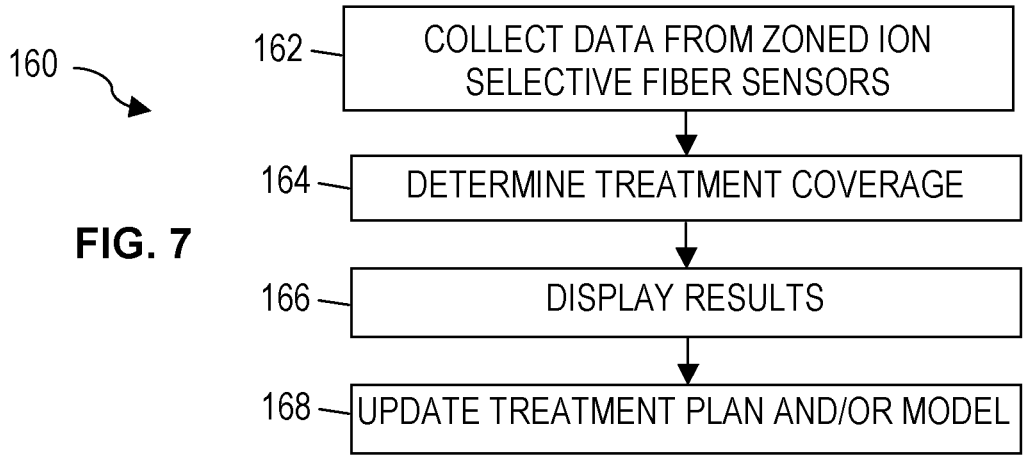
FIG. 7 is a flowchart of an illustrative downhole treatment management method.

FIG. 7 is a flowchart of a downhole treatment management method 160. At block 162 of method 160, data from zoned ISF sensors is collected. For example, data from multiple zones may be collected during treatment injection phases and/or during flowback phases. At block 164, a treatment coverage including parameters such as treatment location, concentration, and movement is determined based on the collected data. The treatment coverage may depend on the treatment type, the effectiveness of the treatment, the timing/duration of treatment injection phases, and the timing/duration of treatment flowback phases. Results are displayed at block 166. The displayed results may be single-zone or multi-zone charts, graphs, or data that show treatment fluid location over time (e.g., during injection phases and during flowback phases), treatment fluid concentration over time (e.g., during injection phases and during flowback phases), treatment results over time, or other data. Further, a treatment plan and/or model is updated at block 168.

To update the treatment plan or model, the determined treatment coverage may be compared with treatment coverage goals or plans. If the treatment coverage goals or plans have not been achieved, a treatment plan may be updated or a new treatment plan may be implemented. The updated or new treatment plan may be applied to a particular zone or to multiple zones. With the determined treatment coverage, treatment models to be used for future treatments may be updated. Changes to a treatment model may include changing the treatments used, the number of treatment stages, the timing/duration of treatment pumpdown and flowback phases, etc. It should be understood that collected data, treatment coverages, treatment plans, and/or treatment models related to method 160 may relate to diversion treatments that inhibit fluid flow or to stimulation treatments that increase fluid flow.

In one example, a treatment for a particular zone (e.g., Z1 in FIG. 3) begins by pumping the treatment fluid to a valve or other opening corresponding to Z1. ISF sensors near the opening are configured to detect that the treatment is being pumped into the formation by detecting a concentration of treatment reactants or tracers ions. In some embodiments, treatment injection modulation is employed whereby different reactants or tracer ions are included in a treatment fluid stream in a manner that facilitates treatment fluid flow monitoring and treatment coverage determination. For example, if the ISF sensors for Z1 detect a predetermined tracer injection modulation pattern during injection phases, a treatment controller or operator is able to measure that the treatment is reaching Z1 and also to measure ion concentration or concentration variance, via the absorption spectra. The concentration variance may be used, for example, to determine the injection flow rate into Z1. During flowback phases, the ISF sensor data may enable a treatment controller or operator to measure the quantity of treatment reactants, the quantity of reaction results, and the backflow rate of treatment reactant or results near the opening or valve related to Z1. In this manner, treatment controller or operator is able to determine the effectiveness of the treatment for Z1. With multiple ISF sensors, the treatment coverage information gathered for Z1 increases.

By monitoring ISF sensors associated with multiple zones (e.g., Z1, Z2, and Z3 in FIG. 3), a treatment controller or operator is able to determine multi-zone treatment coverage information. In some scenarios, treatments injected into the formation at Z1 may flow to Z2 or Z3 (e.g., either through the formation or through an annular connecting the zones). Treatment flows between zones may be desirable or undesirable depending on the treatment plan. For example, if a treatment plan is to stimulate only Z2 (not Z1 and Z3), the treatment controller or operator may update the treatment plan if ISF sensor data shows that stimulation treatment fluid reaches Z1 or Z3. For example, the treatment controller or operator may apply a different stimulation treatment to Z2, may direct less stimulation treatment to Z2, may apply diversion treatments to Z1 or Z3, or other options. Alternatively, if a treatment plan is to stimulate Z1, Z2 and Z3, the treatment controller or operator may update the treatment plan if ISF sensor data shows a lack of stimulation treatment fluid flow at Z2 or Z3. For example, the treatment controller or operator may apply a different stimulation treatment to Z1 (e.g., more treatment, more pressure, or a different treatment type), may apply a stimulation treatment directly to Z2 or Z3, or other options.

As another example, if the treatment plan is to inhibit flow from Z2 (not Z1 and Z3), the treatment controller or operator may update the treatment plan if ISF sensor data shows that diversion treatment flow reaches Z1 or Z3 (e.g., via an annular). For example, the treatment controller or operator may apply a different diversion treatment to Z2, may apply less diversion treatment to Z2, may apply stimulation treatment to Z1 or Z3 to counteract undesired diversion treatment coverage, or other options. Alternatively, if a treatment plan is to inhibit flow from Z1, Z2 and Z3, the treatment controller or operator may update the treatment plan if ISF sensor data shows that diversion treatment does not flow from Z1 to Z2 or Z3 (e.g., via an annular). For example, the treatment controller or operator may apply a different diversion treatment to Z1 (e.g., more treatment, more pressure, or a different treatment type), may apply a diversion treatment directly to Z2 or Z3, or other options.

In alternative embodiments, ISF sensors for the different zones (e.g., Z1-Z3) may be used to monitor injection phases or flowback phases of friction reducer treatments, corrosion treatments, and/or scaling treatments. Further, the ISF sensors may be employed to detect evidence of formation damage (e.g., sandstone creates precipitates when damaged) for different zones. The treatment controller or operator may adjust treatments, apply new treatments, or formulate new treatments or models in response to collected ISF sensor data to monitor such friction reducer treatments, corrosion treatments, scaling treatments, or evidence of formation damage.

Figure 8:
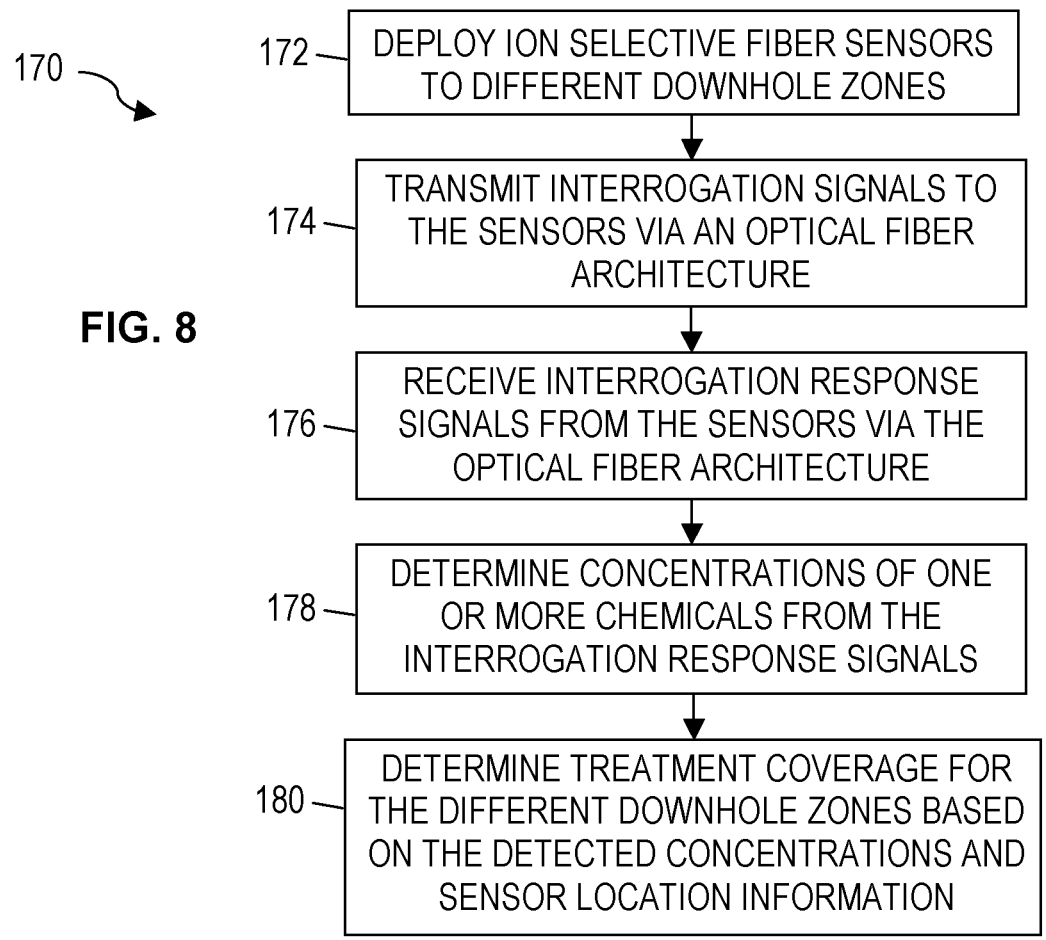
FIG. 8 is a flowchart of an illustrative downhole treatment coverage determination method.

FIG. 8 is a flowchart of an illustrative downhole treatment coverage determination method 170. At block 172 of method 170, ISF sensors are deployed to different downhole zones. At block 174, interrogation signals are transmitted to the ISF sensors via an optical fiber architecture. The optical fiber architecture may be a reflective optical fiber architecture with ISF sensors arranged in series as in FIG. 6B, a transmissive loop optical fiber architecture with ISF sensors arranged in series as in FIG. 6D, a reflective optical fiber architecture with ISF sensors distributed among reflective branches as in FIG. 6A, or a transmissive loop optical fiber architecture with ISF sensors arranged among transmissive branches as in FIG. 6C.

At block 176, interrogation response signals are received from the ISF sensors via the optical fiber architecture. At block 178, concentrations of one or more chemicals are determined from the interrogation response signals. The interrogation response signals may correspond to light that has been altered by the ISF sensors in the presence of predetermined chemicals related to treatments. At block 180, a treatment coverage for the different downhole zones is determined based on the detected concentrations and sensor location information. The treatment coverage determined for method 170 may relate to diversion treatments that inhibit fluid flow or to stimulation treatments that increase fluid flow.

Use of ISF sensors to determine treatment zonal coverage as disclosed herein provides various advantages. For example, ISF sensors do not need to be calibrated if collocated pH and/or temperature sensors are deployed to null the effects of total hydrogen concentration and temperature changes. Further, the surrounding solution does not need to be colorless. Accordingly, the ionic measurements can be performed in highly attenuating "colored" solutions since total optical transmission insertion loss through the dye-sensitized sensor length is designed to be low enough to allow multiplexing of many sensor lengths over a total transmission length of downhole fiber cable. Further, optical fibers are insensitive to electromagnetic fields, electrical ground loops, electrostatic/lightning discharge, high temperatures, high pressures, salient hydrocarbons, and other wellbore fluids. Further, direct and localized indication of the presence or absence of acid reaction species are obtained as opposed to indirect pressure or temperature measurements. Further, unreliable downhole electronics are avoided and thus permanent "life-of-well" applications are possible.

The disclosed ISF technology may be deployed in a stand-alone capacity or in addition to other sensor technologies. Further, the disclosed ISF technology may be deployed temporarily for a stimulation job (as in a coiled tubing) or permanently as a fiber optic cable in the wellbore (generally behind the casing). In some embodiments, discontinuous point ISF sensors (pseudo-distributed sensor strings) are created with a finite length of fiber and cladding at each desired sensor location. The ISF sensor is configured in such a way that the cladding is exposed to the wellbore fluid. It is also possible to employ a continuum of dye-sensitized cladding for fully distributed ion concentration sensing. In a cased and perforated well, one or more ISF sensors may be installed within each perforation zone to determine if a treatment has reached a particular zone. The desired density of the ISF sensors per unit length of the wellbore may depend on criteria such as the flow rate (production or injection) and the total depth of the pay zone. The change in concentration of certain ions in the wellbore fluid, with time, is used to determine the treatment coverage along the wellbore. Multiple ISF sensors may be installed at each location within each perforation zone depending on the measurement variables of interest.

Numerous modifications, equivalents, and alternatives will become apparent to those skilled in the art once the above disclosure is fully appreciated. For example, though the methods disclosed herein have been shown and described in a sequential fashion, at least some of the various illustrated operations may occur concurrently or in a different sequence, with possible repetition. It is intended that the following claims be interpreted (where applicable) to embrace all such modifications, equivalents, and alternatives.

What is claimed is:

1. A system, comprising:
   an optical fiber comprising a plurality of ion selective fiber sensors;
   a surface interface configured to input interrogation signals to the optical fiber and to collect treatment concentration measurements from the ion selective fiber sensors in response to each interrogation signal; and
   a computer that receives at least some of the treatment concentration measurements collected by the surface interface, wherein the computer determines treatment coverage for different downhole zones based on the received treatment concentration measurements.

2. The system of claim 1, wherein at least some of the plurality of ion selective fiber sensors are configured to measure a concentration variance of a stimulation treatment chemical species.

3. The system of claim 1, wherein at least some of the plurality of ion selective fiber sensors are configured to measure a concentration variance of a stimulation treatment reaction result.

4. The system of claim 1, wherein at least some of the plurality of ion selective fiber sensors are configured to measure a concentration variance of a diversion treatment chemical species.

5. The system of claim 1, wherein at least some of the plurality of ion selective fiber sensors are configured to measure a concentration variance of a diversion treatment reaction result.

6. The system of claim 1, further comprising a stimulation treatment control interface in communication with the computer, wherein the stimulation treatment control interface is configured to update an ongoing stimulation treatment plan using the treatment coverage determined by the computer.

7. The system of claim 1, further comprising a stimulation treatment control interface in communication with the computer, wherein the stimulation treatment control interface is configured to update a stimulation treatment model for future stimulation treatments using the treatment coverage determined by the computer.

8. The system of claim 1, further comprising a diversion treatment control interface in communication with the computer, wherein the diversion treatment control interface is configured to update an ongoing diversion treatment plan using the treatment coverage determined by the computer.

9. The system of claim 1, further comprising a diversion treatment control interface in communication with the computer, wherein the diversion treatment control interface is configured to update a diversion treatment model for future diversion treatments using the treatment coverage determined by the computer.

10. The system of claim 1, wherein at least some of the plurality of ion selective fiber sensors are arranged in series along a reflective single-end optical fiber architecture.

11. The system of claim 1, wherein at least some of the plurality of ion selective fiber sensors are arranged in series along a transmissive loop optical fiber architecture.

12. The system of claim 1, wherein at least some of the plurality of ion selective fiber sensors are distributed among reflective branches of a reflective optical fiber architecture.

13. The system of claim 1, wherein at least some of the plurality of ion selective fiber sensors are distributed among transmissive branches of a transmissive loop optical fiber architecture.

14. The system of claim 1, wherein the optical fiber is deployed along an exterior of a casing string that extends through the different downhole zones.

15. The system of claim 1, wherein the optical fiber is deployed along an exterior of a production tubing string that extends through the different downhole zones.

16. The system of claim 1, wherein each ion selective fiber sensor comprises a reagent region integrated with the optical fiber.

17. The system of claim 1, wherein each reagent region comprises an exposed cladding layer portion of the optical fiber.

18. A method performed by a computer, the method comprising:

collecting treatment concentration measurements from an optical fiber comprising a plurality of downhole ion selective fiber sensors; and determining treatment coverage for different downhole zones based on the collected treatment concentration measurements.

19. The method of claim 18, further comprising updating a stimulation treatment plan based on the treatment coverage determined by the computer.

20. The method of claim 18, further comprising updating a diversion treatment plan based on the treatment coverage determined by the computer.

21. The method of claim 18, further comprising generating a time chart displaying stimulation treatment coverage over time based on said collecting and said determining.

22. The method of claim 18, further comprising generating a time chart displaying diversion treatment coverage over time based on said collecting and said determining.

23. A downhole treatment management system, comprising:

a data analysis unit that receives treatment concentration measurements collected from an optical fiber comprising a plurality of downhole ion selective fiber sensors, and that determines treatment coverage for different downhole zones using the received treatment concentration measurements; and a treatment control interface in communication with the data analysis unit, wherein the treatment control interface updates treatment operations based on the treatment coverage determined by the data analysis unit.

24. A downhole treatment management system of claim 23, wherein the treatment control interface is configured to update diversion treatment operations or stimulation treatment operations based on the treatment coverage determined by the data analysis unit.

* * * * *